Figure 1:
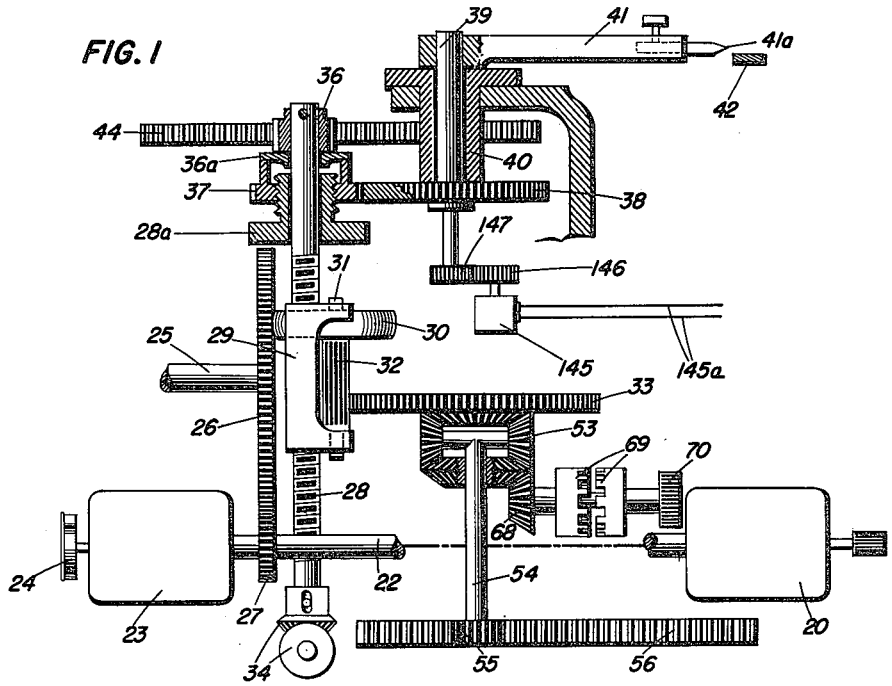

June 17, 1952 L. G. POOLER ET AL 2,600,428
BOMBING METHOD AND APPARATUS
Filed Dec. 18, 1943 4 Sheets-Sheet 1

INVENTORS
MALCOLM F. SCHOEFFEL
BY LOUIS G. POOLER
ATTORNEY

INVENTORS
MALCOLM F. SCHOEFFEL
LOUIS G. POOLER
BY
ATTORNEY

Patented June 17, 1952

2,600,428

UNITED STATES PATENT OFFICE 2,600,428

BOMBING METHOD AND APPARATUS

Louis G. Pooler, United States Navy, Alexandria, Va., and Malcolm F. Schoeffel, United States Navy, Washington, D. C.

Application December 18, 1943, Serial No. 514,870

15 Claims. (Cl. 343—5)

(Granted under the act of March 3, 1883, as amended April 30, 1928; 370 O. G. 757)

This invention relates to precision bombing and more particularly to a novel method of bombing targets with the use of radar, or radio detection and ranging, for determining the proper point of release of the bomb, and to a novel radar bombsight by which the method may be practiced expeditiously.

Optical bombsights now in use perform two functions, as follows: (1) They enable the pilot to guide the aircraft on a collision course whereby the aricraft's track passes in the proper position with respect to the target so that the bomb, when released, will hit the target in deflection; and (2) they calculate the proper point of release of the bomb so that it will have the correct range to hit the target. In performing the first function, the bombsight by manual adjustment of its optical system, establishes a correct drift angle in the case of a cross-wind and corrects for the cross-trail of the bomb flight due to such cross-wind. In performing the second function, the bombsight employs the values of the known time of flight of the bomb, $t_f$ (which is determined for a bomb with a given ballistic coefficient from the altitude (H) and air speed of the aircraft), the speed of approaching or closing the target along the ground at the instant of bomb release, $V_c$ (which is computed in the bombsight with the use of its optical system), and the known trail factor, T (which is determined for a bomb having a given ballistic coefficient from the altitude (H), and the air speed of the aircraft), the bombsight being operable to solve the right triangle having the altitude (H) as one side, the horizontal bomb range ($V_c t_f - T$) as the other side, and the slant range as the hypotenuse, for the dropping angle ($\theta$). The bomb is released when the optical or telescope axis is at an angle to the vertical equal to the dropping angle, that is, $$\tan^{-1} \frac{(V_c t_f) - T}{H}$$

One object of the present invention resides in the provision of a novel bombing method and bombsight in which radar is employed in the determination of the dropping angle, whereby use of an optical system is unnecessary.

Another object of the invention is to provide a novel bombing method and bombsight in which radar is employed in the determination of the collision course, whereby use of an optical system is unnecessary.

A further object is to provide a novel bombing method and bombsight in which the dropping angle is determined with the use of a radar indication of the slant range from the aircraft to the target.

Still another object of the invention resides in the provision of a novel bombing method and bombsight wherein the collision course is determined with the use of a radar indication of the bearing or deflection of the target.

Another object of the invention is to provide a novel bombing method and bombsight in which the speed of closing the target, ($V_c$), in solving for the dropping angle as outlined above, is computed while approaching the target by obtaining the slant range or hypotenuse ($s$) of a small right triangle having the known aircraft altitude (H) represented by one side ($h$) and an assumed horizontal range (R) to the target represented by the other side ($r$), multiplying this slant range ($s$) by the known ratio of $H/h$, and comparing the product with a radar indication of the actual slant range to the target, whereby the speed of closing ($V_c$) is the known value $H/h$ multiplied by the rate of change of ($r$) necessary to maintain the said product equal to the actual radar-measured slant range.

An additional object of the invention is to provide a radar bombsight of the character described having a directive antenna stabilized in the yaw, pitch and roll axes, through which electromagnetic energy is transmitted to a target and received as reflections to provide an indication of the slant range to the target, and a computer coupled to the radar system and in which the radar slant range indication is utilized in solving for the proper dropping angle.

Figure 2:
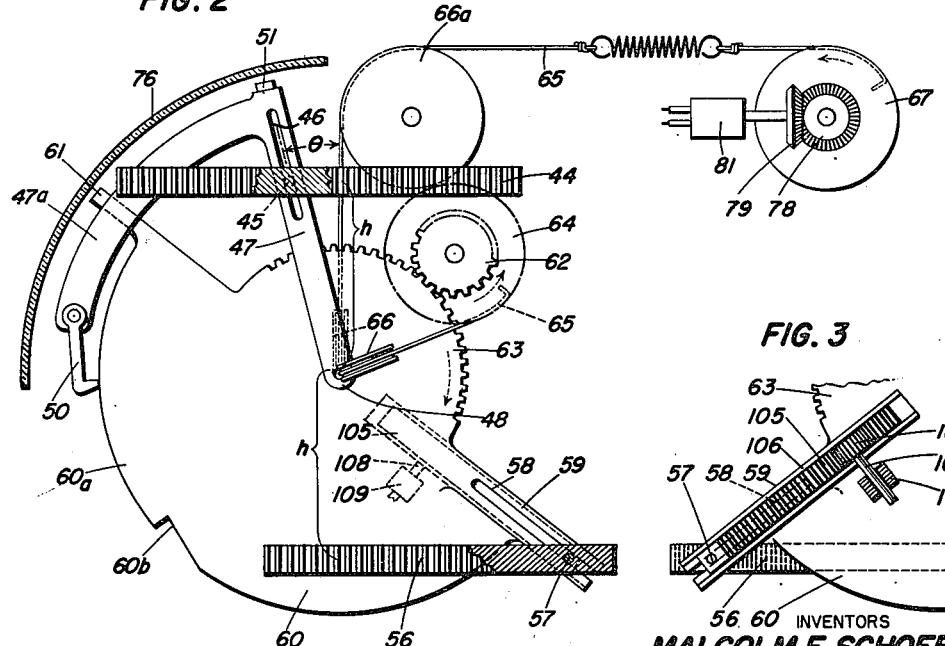
Figure 3:
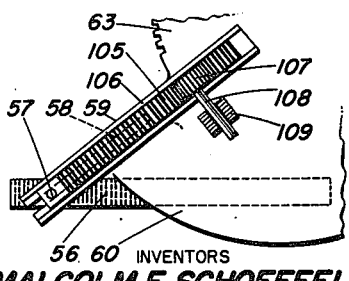
Figure 4:
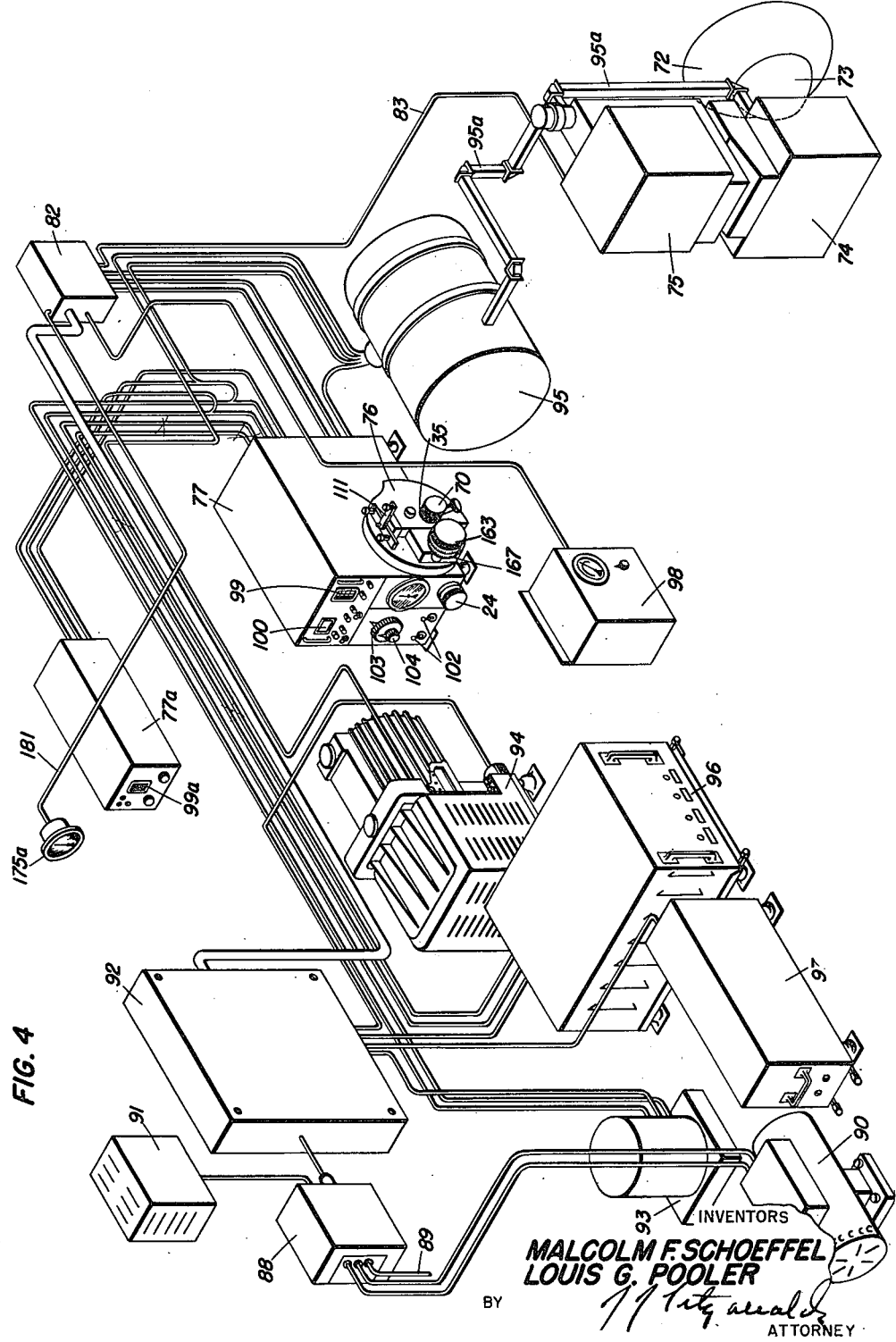
Figure 5:
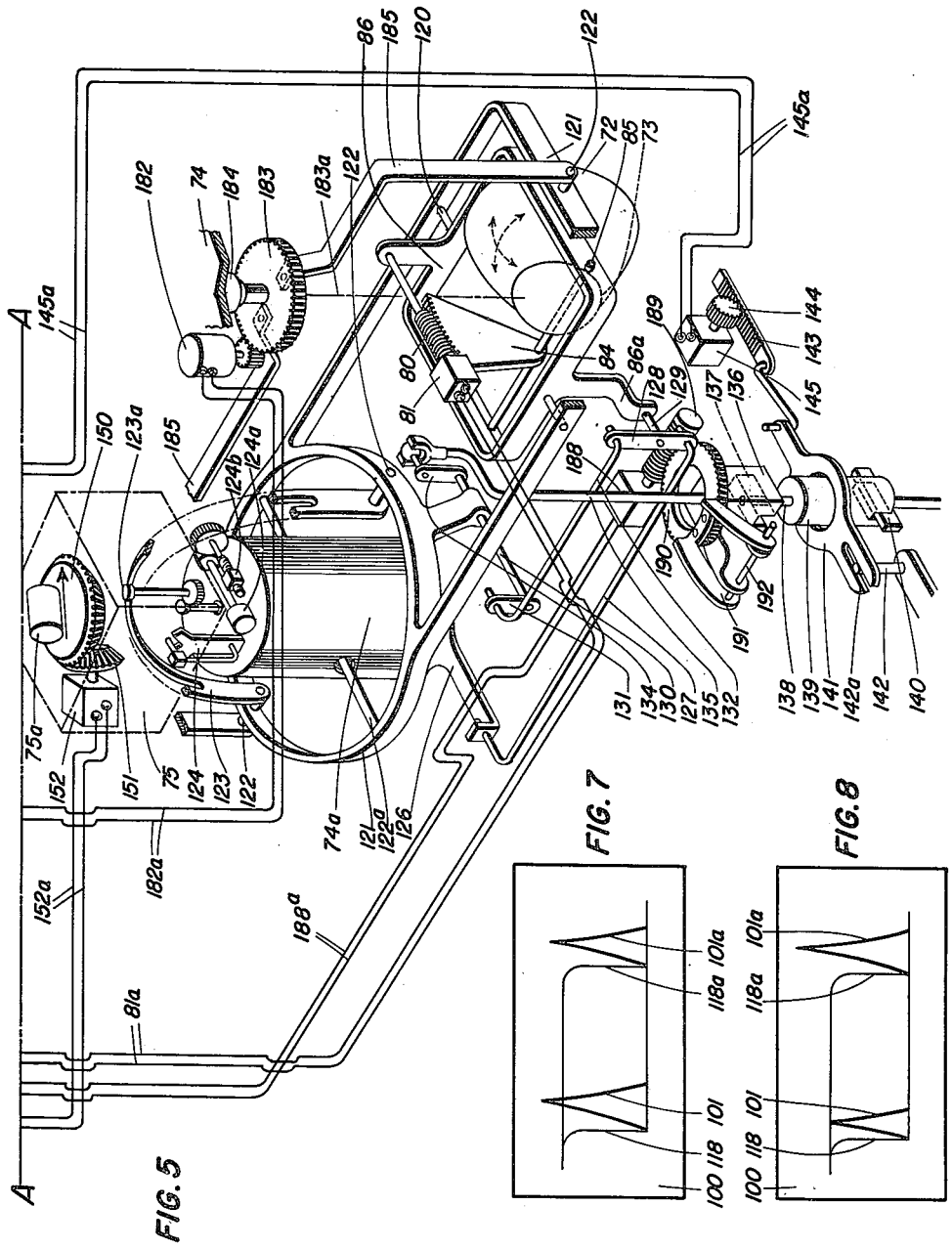
Figure 6:
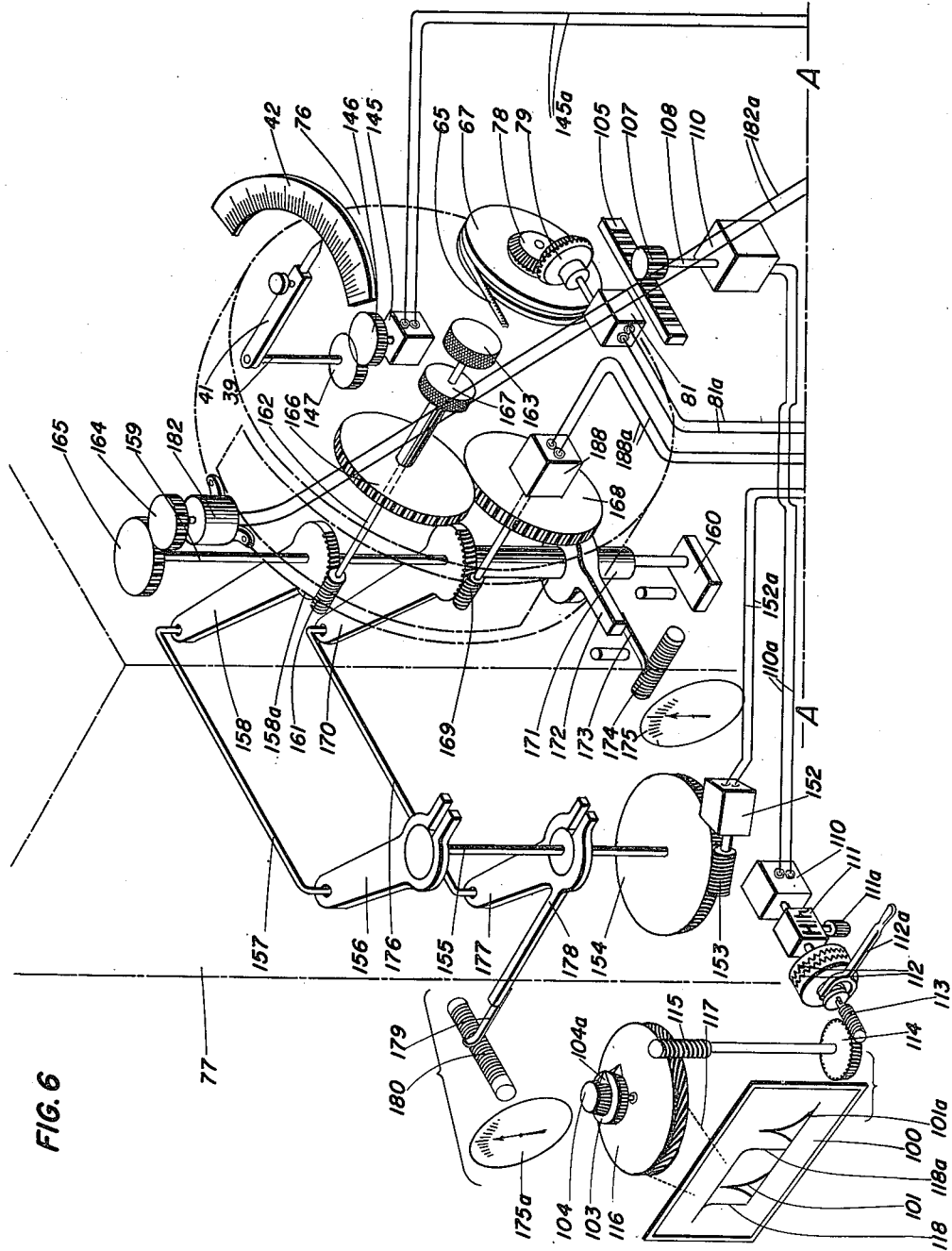

These and other objects of the invention may be better understood by reference to the accompanying drawings, in which Figs. 1, 2 and 3 are schematic views of one form of the mechanism for solving the dropping angle;

Fig. 4 is a schematic view in perspective of a radar bombsight made in accordance with our invention and embodying the mechanism shown in Figs. 1, 2 and 3 and one form of a radar system;

Figs. 5 and 6 are schematic views in perspective of the radar antenna stabilizing means and the collision course and dropping angle solving mechanisms, respectively, showing the connections between the parts, and Figs. 7 and 8 are front views of the radar precision scope illustrated in Figs. 4 and 6, showing the appearance of the scope under different operating conditions of the bombsight.

Various forms of bombsights have been devised for mechanically solving the right triangle referred to heretofore, in which the altitude (H) is one side, the horizontal bomb range to the target ($V_c t_f$—T) is the other side, and the slant range to the target is the hypotenuse. By solving this triangle the bombsight automatically solves the dropping angle ($\theta$), which is $$\tan^{-1} \frac{(V_c t_f) - T}{H}$$

One form of such a bombsight which is well known in the art is illustrated in part in Figs. 1 and 2. As there shown, the mechanism for making the triangular solution comprises a constant speed motor 20 for driving a shaft 22 connected to a governor 23 and a speed regulator 24. Rotatably mounted on a shaft 25 is a disc 26 adapted to be driven by the motor through a pinion 27 on the motor shaft. A vertical screw spindle 28, disposed in parallel spaced relation to the face of disc 26, has a carriage 29 threaded thereon for supporting a roller 30 rotatable on a vertical stub shaft 31 parallel to the disc face and intersecting its axis 25. The periphery of roller 30 engages the face of disc 26, which may be spring pressed against the roller, and rotation of the screw spindle 28 causes carriage 29 to move the roller vertically along the disc face and radially with respect to the disc axis 25, so that the speed at which the roller is driven by the disc may be varied and is proportional to the distance of the roller from the disc axis. The roller shaft 31 is provided with an elongated pinion 32 which meshes with a drive gear 33 on the opposite side of the carriage 29 from disc 26, whereby rotation of the carriage on the spindle is prevented due to the position of the carriage between the disc and the gear 33.

Spindle 28 is rotatable and movable vertically in a suitable bearing 28a, rotation of the spindle being effected through bevel gears 34 at its lower end, by a suitable rate knob 35 (Fig. 4). At its upper end, the spindle 28 is supported by a pinion 36 which rests on a thrust washer 36a. The washer 36a, in turn, is supported on a nut gear 37 threaded on the spindle bearing 28a and meshing with a gear 38 which is connected to a shaft 39 rotatable in a bearing 40 by a trail arm 41. It will be apparent that by swinging the trail arm 41, the spindle 28 may be raised or lowered through the nut gear 37 so as to adjust the roller position on disc 26 without rotating the spindle. The amount of the trail arm adjustment is indicated by a pointer 41a on a suitable trail scale 42 directly below the arm 41.

The pinion 36 meshes with a rack 44 slidable on a suitable support (not shown) and having a stud 45 (Fig. 2) engaged in a slot 46 in a rate arm 47. The arm 47 is pivotally mounted at one end on a shaft 48 and at its free end has an arcuate portion 47a carrying a pivoted release finger 50. Rotation of the spindle 28 by rate knob 35 and gearing 34 adjusts the roller 30 radially on disc 26 and, at the same time, drives the rate rack 44 through pinion 36 so as to swing the rate arm 47 from the vertical by the action of the stud 45 in slot 46. A rate indicator 51 is slidable longitudinally on the arm 47 and is connected in its inner end to the stud 45, so that the outer end portion of the indicator is projected from arm 47 by outward movement of the stud 45 in slot 46. The outer end portion of indicator 51 has suitable markings (not shown) to indicate the rate adjustment of arm 47.

The drive gear 33 is connected through a differential 53 to a shaft 54 and a pinion 55 meshing with a drive rack 56 movable longitudinally on a suitable support (not shown). A stud 57 on rack 56 is engaged in a slot 58 in a drive arm 59 which is integral with a sector plate 60, the plate being rotatable on shaft 48 independently of the rate arm 47. On the periphery of the sector plate 60 is a cam surface 60a engageable with the release finger 50 and terminating in a notch 60b which is so disposed that the finger 50 is adapted to enter the notch when the slot 58 and the slot 46 are on a common diameter through the axis of shaft 48. The plate 60 has a sight angle indicator 61 which indicates the angular position of the plate on a scale (not shown).

In the bombsight as described, a small right triangle is formed in which the hypotenuse is represented by a line from shaft 48 along arm 47 to stud 45 on rack 44, one side ($h$) is represented by a line from the rack 44 to shaft 48 and perpendicular to the rack, and the other side is represented by a line along rack 44 from the vertical line ($h$) to the stud 45. A second right triangle is also formed in which the hypotenuse is represented by a line from shaft 48 along arm 59 to stud 57, one side ($h$) is represented by a line from rack 56 to shaft 48 and perpendicular to the rack, and the other side ($r$) is represented by a line along rack 56 from the vertical line ($h$) to the stud 57. This second triangle is similar to the triangle formed in space by the aircraft's altitude or vertical to the aircraft (H), the distance along the ground from the foot of this vertical to the target, and the line of sight between the plane and the target, whereby the second triangle in the bombsight has in it an angle ($y$) equal to the sight or range angle.

In prior bombsights, a stabilized telescope is moved in a vertical plane on a horizontal axis by a pinion 62 meshing with a gear 63 on sector plate 60. The pinion 62 drives a sheave 64 connected to a cable 65 which passes over sheaves 66 on shaft 48 and over a sheave 66a to a driven sheave 67 coupled to the telescope, whereby rotation of plate 60 causes a corresponding rotation of the telescope on the horizontal axis. Thus, the telescope axis may be considered as a line on arm 59 from the shaft 48 to stud 57. The telescope may be turned on its horizontal axis independently of roller 30 by a bevel gear 68 meshing with the differential 53 and rotatable through a clutch 69 from a displacement knob 70. By adjusting the screw spindle 28 from rate knob 35 and adjusting the angle of arm 59 through displacement knob 70, the bombardier can maintain the target on the horizontal reference line of the telescope, and when the telescope sight angle ($y$) equals the angle ($\theta$) as set into the first triangle by rotation of arm 47, the finger 50 enters notch 60b and actuates suitable means for releasing the bomb.

In practice, the two sides of the right triangle having the dropping angle ($\theta$) equal to $$\tan^{-1} \frac{(V_c t_f) - T}{H}$$

are considered as velocities and the dropping angle is solved just as if the sides were lengths. To do this, the altitude (H) is considered as vertical velocity of the bomb, and this velocity is set into the sight by adjusting the speed knob 24 on the governor, which controls the speed of disc 26. By a constant of design, K, a disc speed (Ds) is set in which proportional to the reciprocal of the time of fall for the given altitude (H). The manner in which the angle $$\tan^{-1} \frac{(V_c t_f) - T}{H}$$

is set into the sight is as follows: As the trail, T, is set by adjustment of arm 41 the roller 30 is displaced above the disc axis a distance proportional to the trail, without turning the screw spindle 28, so that the introduction of trail raises the carriage and roller. Then, as the bombardier turns the spindle 28 from the rate knob 35 to cause the horizontal reference line in the telescope to move along the ground at the same rate as the target, for synchronism, he moves the roller 30 further above the disc axis until the roller distance is sufficient to give the desired synchronism. By turning the spindle 28, the rate arm 47 is rotated to a position so that the distance of stud 45 from the vertical is proportional to the amount the rate knob is turned. In other words, the roller distance from the disc axis is proportional to $$\frac{V_c t_f}{H}$$

However, only part of this roller distance is due to rotation of the rate knob 35 and spindle 28. The remainder of the roller distance, as set in by the rate knob and spindle rotation, is proportional to $$\frac{(V_c t_f) - T}{H}$$

Therefore, when the sight is properly synchronized, the rate arm 47 is at an angle ($\theta$) to the vertical ($h$) equal to the dropping angle $$\tan^{-1} \frac{(V_c t_f) - T}{H}$$

Thus, when the sight angle ($y$) to the target, as represented by arm 59 and the vertical ($h$), equals this dropping angle ($\theta$), so that the bomb is released due to engagement of finger 50 in notch 60b, the bomb should have the proper range to hit the target.

According to the present invention, the triangular solution of the dropping angle ($\theta$) is governed in part by the radar indication of the actual slant range to the target, which corresponds to the distance from shaft 48 to stud 57 multiplied by H/h when the angle ($y$) between arm 59 and the vertical ($h$) represents the sight angle to the target. In the preferred form of the invention, a value corresponding to the distance from shaft 48 to the stud 57 multiplied by H/h is compared with the radar slant range indication, and the screw spindle 28 and displacement knob 70 are adjusted to maintain this value matched and in synchronism with the radar slant range indication.

More particularly, in the new bombsight the sheave 67, instead of being connected to a telescope as in prior bombsights, is connected to a directive antenna 72 of a radar system, such as that illustrated in Fig. 4, whereby the sector plate 60 rotates the antenna, as will be described in greater detail presently, so that the antenna axis corresponds to the arm 59. The antenna 72 is mounted on a head 73 through which the antenna is lobed in a manner well known in the art. The antenna head 73, in turn, is stabilized about the pitch and roll axes of the aircraft by a gyro in a housing 74, and the head 73 is also stabilized in azimuth by a directional gyro in a housing 75 (Fig. 4). The triangular solving mechanism illustrated in Figs. 1 and 2 is supported in a head 76 rotatable in a horizontal plane relative to a bombardier's control-indicator box 77 on which the head 76 is mounted. The connection between the sector plate 60 and the antenna head 73 may take various forms but, as shown, comprises a bevel gear 78 mounted on the sheave 67 and meshing with a bevel gear 79 which drives a worm 80 through a synchro-controlled servo mechanism including synchros 81 in the head 76 and housing 75, respectively, connected by wiring 81a leading through a junction box 82 and a cable 83. The worm 80 drives a sector gear 84 on a shaft 85 rotatable on a frame 86 and supporting the antenna head 73, so that rotation of gear 84 by worm 80 turns the antenna and its head 72 about the horizontal axis 85.

The radar system, as shown in Fig. 4, comprises a relay box 88 connected through a cable 89 to suitable batteries (not shown). The relay box 88 is connected to a motor alternator 90 which supplies electric power at a constant voltage, regulated by a regulator 91, to a power distributor 92 for supplying power to the system. Power from distributor 92 is fed through an H. V. rectifier 93 and a modulator 94 and delivered to an R. F. unit 95 in the form of pulses. The R. F. unit 95 transmits the energy pulses through a suitable connector 95a and the head 73 to the antenna 72. A portion of the electromagnetic energy reflected from the target is received through the antenna, the connector 95a, and the R. F. unit 95 which feeds the received pulses to a receiver 96 supplied with H. V. power from rectifier 97 through distributor 92. The receiver 96 is connected to the control-indicator box 77 which provides indications of the reflected energy. A control box 98 is coupled to the junction box 82.

The radar system is of a type known in the art which provides radar presentations in a search scope 99 and a precision scope 100, the scopes being mounted in the bombardier's control box 77. If desired, a duplicate search scope 99a may be provided in a control box 77a adjacent the pilot. When the search scope 99 is employed, the antenna head 73 is rotated about a vertical axis with a scanning motion, and the field which is scanned is presented as radar indications in the search scopes 99 and 99a. Means for producing the scanning motion of the antenna and presenting the scanned field in the search scopes 99 and 99a are well known in the art and are not illustrated in detail, since such means per se form no part of the present invention. When the precision scope 100 is turned on, the antenna 72 is lobed by suitable means in the head 73, and the radar presentation is substantially as indicated in Figs. 6, 7 and 8. That is, the target is indicated on the precision scope 100 by longitudinally spaced "pips" 101 and 101a which move to the left along the scope as the target slant range decreases. Also, when the axis of the lobing antenna 72 is on the target in azimuth, the pips 101 and 101a are equal in height, and any change in the relative heights of the pips indicates a deflection of the target from the antenna axis. The scopes 99 and 100 may be turned on and off selectively by means of suitable switches 102 on the panel of control box 77. A range knob 103 is also provided on the box 77 to set the search scanning operation for different ranges. A range matching dial 104 is rotatable independently of dial 103, and when the precision scope 100 is turned on, is adjustable to match the usual steps with the pips on scope 100 to indicate the slant range on a suitable scale (not shown) on the face of dial 103, as will be described in greater detail presently.

The knob 104 is rotatable automatically in accordance with the change in the distance (r) between shaft 48 and stud 57. More particularly, a rack 105 is slidable longitudinally on the arm 59 in a groove or track 106, and one end of the rack 105 is connected to stud 57, the center line of rack 105 intersecting the shaft 48. The rack 105 is adapted to drive a pinion 107 connected to a shaft 108 which is rotatable in a bearing 109 mounted on the sector plate 60. The shaft 108 (Fig. 6) is connected through a synchro-controlled servo mechanism, including synchros 110 and wiring 110a, to a multiplier 111 which is adjustable manually by a knob 111a to set in the known value of H/h.

It will be understood that the multiplier 111 and the adjacent synchro 110 are located in the control box 77, while the other synchro 110 adjacent to pinion 107 is located in the movable head 76. The multipler 111 is connected through a clutch 112, operable by a lever 112a, to a worm 113 for driving a wheel 114. The wheel 114 drives a worm 115 meshing with a wheel 116 disposed behind the panel of control box 77. The wheel 116 is rotatable manually by the range matching knob 104 when clutch 112 is disengaged, and is operable through a suitable electrical connection, represented diagrammatically by reference numeral 117, to adjust the usual cathode ray oscilloscope (not shown) so as to vary the positions of steps 118 and 118a relative to the pips 101 and 101a on the precision screen 100. When the range matching dial 104 is rotated to match the steps 118 and 118a with the corresponding pips 101 and 101a, as shown in Figs. 7 and 8, the slant range reading appears on a suitable scale on the face of dial 103 under a pointer 104a on dial 104.

The pips 101 and 101a both represent reflected pulses. More particularly, the lobe switching commonly employed in radar systems of the type described, during lobing of the antenna, causes beams of radiation to be sent alternately in two directions, a few degrees apart in a horizontal plane, and a single target will reflect pulses from both beams, causing the double signals or pips 101, 101a to appear on the scope or screen. When the target is to the left of the central axis of the lobing antenna, a stronger reflecting pulse will be received from the left beam of radiation, so that the left signal or pip on the scope will be higher than the right pip. When the target is directly on the axis on the lobing antenna, reflected pulses of equal intensity will be received from the two beams of radiation so that the two signals or pips on the screen will be of equal height.

Thus, the distance between the pips 101 and 101a is constant, and the slant range is a measure of the distance of the pips from one end of the screen, as determined by adjusting the range measuring dial 104 to match the steps 118, 118a with the pips. While the pips 101, 101a will constantly increase in height as the slant range decreases, they increase in height simultaneously so that their relative heights will continue to indicate the position of the target in azimuth with respect to the central axis of the lobing antenna.

It will be understood that the steps 118, 118a are similar in nature to the pips 101, 101a, except that the steps do not represent reflected pulses from the target (actual slant range) but instead serve as reference or index points (of constant height) to indicate the slant range in the computer when the range measuring dial 104 is driven from the computer rack 105, and to indicate the actual slant range by matching the steps with the pips and observing the reading of dial 104.

The antenna head 72 is stabilized about the pitch and roll axes of the aircraft, and to this end the frame 86 is connected to shafts 120 rotatably mounted in a frame 121, the shafts 120 having common axes passing through the axis of the antenna head 72. The frame 121, in turn, is rotatably mounted on shafts 122 supported in the housing 74, as will be described in greater detail presently. A suitable gyro (not shown) in a gyro casing 74a is mounted on shafts 122a on the frame 121. The gyro in casing 74a may be erected vertically in any suitable manner, as by means of an inverted pendulum 123 having frictional means 123a for exerting precessional forces, and another inverted pendulum 124 having suitable means including a motor 124a for moving a weight 124b. As such erection means for vertical gyros are well known in the art, a detailed description thereof is unnecessary. An arm 126 on gyro casing 74a is connected by a link 127 to the lower end of a lever 128 which is connected intermediate its ends by a pin 129 to an arm 86a on frame 86, whereby the frame 86 is stabilized in a horizontal plane about the roll and pitch axes 120 and 122, respectively, except for cross-trail corrections to be described presently.

A shaft 130 is rotatable on a suitable arm on the frame 121 and is connected at one end through a crank 131 and a link 132 to the upper end of lever 128. The other end of the shaft 130 has a rock arm 134 connected through a universal joint to a vertical lever 135, the lower end of lever 135 being connected to a cam block 136. In its lower face, the block 136 is provided with a longitudinal slot 137 which receives a pin 138 mounted on a block 139. The block 139 is movable longitudinally on a guide 140 by means of a yoke 141 which is guided for longitudinal movement by a pin 142 engaged in a slot 142a in the yoke. A rack 143 is coupled to the yoke 141 and is adapted to be driven longitudinally by a pinion 144 which is connected through a synchro-controlled servo mechanism, including synchros 145 and wiring 145a, to a gear 146 in the head 76. It will be understood that the synchro 145 adjacent the rack 143 is disposed in housing 74, while the synchro 145 adjacent gear 146 is disposed in the head 76. The gear 146 meshes with a gear 147 mounted on the lower end of shaft 39 which is rotatable by the trail arm 41 (Fig. 1). Thus, adjustment of the trail arm 41 causes longitudinal movement of the yoke 141 and block 139 and thereby adjusts the longitudinal position of pin 138 in the slot 137 of the cam block.

The azimuth gyro 75a, which is mounted in housing 75, is connected to a bevel gear 150 and serves to maintain this gear in a fixed position in azimuth, whereby the aircraft may move around the gear 150 without changing the position of the gear in azimuth. The gear 150 meshes with a bevel gear 151 which is connected through a synchro-controlled servo mechanism, including synchros 152 and wiring 152a, to a worm 153 in the control box 77. The worm 153 is adapted to drive a worm wheel 154 connected to a vertical shaft 155. Frictionally clutched to the upper end of shaft 155 is an arm 156 connected by a link 157 to an arm 158 having a gear segment 158a rotatable on a vertical shaft 159. The gear 158a is rotatable relative to the vertical shaft 159, which is fixed in the control box 77.

A worm 161 meshes with the gear 158a and is mounted on a shaft 162 in suitable bearings on the head 76, the shaft 162 being rotatable manually by a turn knob 163. Thus, rotation of knob 163 causes the worm 161 to rotate the entire head 76 about the shaft 159 as an axis, the gear 158a being held stationary in azimuth by the wheel 154 connected to the azimuth gyro 75a. A gear 164 is rotatable on a vertical shaft mounted on the head 76 and meshes with a gear 165 on the upper end of the shaft 159. Accordingly, when the head 76 is rotated about shaft 159 by turn knob 163, the gear 164 is rotated by its engagement with gear 165, which is held stationary by shaft 159. A gear 166 is loosely mounted on shaft 162 and is rotatable independently thereof by a drift knob 167. The gear 166 meshes with a gear 168 mounted on the head 76 and adapted to drive a worm 169 which, in turn, drives a gear segment rotatable on the shaft 159 and having an arm 170. A sleeve 171 is rotatable with arm 170 and is loosely mounted on the shaft 159, the sleeve being connected through a suitable friction coupling to an arm 172. A brush 173 on the arm 172 forms part of a variable resistance including a resistance element 174 fixed on the aircraft and connected in a suitable circuit (not shown) for operating the pointer of a bombardier's direction indicator (BDI) 175. Such indicators are well known in the art and it is unnecessary to illustrate the details thereof. At its outer end, the arm 170 is connected through a link 176 to an arm 177, connected to shaft 155 through a suitable friction clutch. Integral with the arm 177 is an arm 178 which carries a brush 179 engaging a resistance element 180 fixed on the aircraft. The variable resistance 179—180 is connected in a circuit which leads to a pilot's direction indicator (PDI) 175a similar to the indicator 175, whereby movement of brush 179 along resistance 180 adjusts the pointer of indicator 175a.

The gear 164 is connected through a synchro-controlled servo mechanism, including synchros 182 and wiring 182a, to a horizontal gear 183 rotatably mounted on the housing 74 in a bearing 184. The gear 183 carries a bracket 185 on which the shaft 122 is rotatably mounted, whereby rotation of gear 183 turns the gyro assembly, including frame 121, about a vertical axis 183a through the antenna head 72.

The gear 168 (Fig. 6) is connected through a synchro-controlled servo mechanism, including synchros 188 and wiring 188a, to a worm 189 mounted in the gyro housing 74. The worm 189 drives a ring gear 190 suitably mounted in the housing 74 and having the vertical lever 135 extending through it. The gear 190 carries arms 191 supporting a horizontal shaft 192 connected to the cam block 136, whereby rotation of gear 190 swings the block 136 about the pin 138 as an axis. When the trail arm 41 is set at zero, the pin 138 is in line with the end of lever 135, so that rotation of gear 190 through adjustment of the drift knob 167 has no effect on the crank arm 134. However, when trail arm 41 is moved to make the desired trail setting, the pin 138 is displaced from lever 135 along the groove 137 in cam block 136, the amount of displacement of pin 138 being proportional to the trail setting of arm 41. Thus, when gear 190 is rotated by drift knob 167, the cam block 136 is turned about the displaced pin 138 as an axis, whereby lever 135 and crank arm 134 are moved an amount proportional to the product of the trail (T) and sin (x), where (x) is the drift angle set up by the drift knob 167, as will be described in greater detail presently. As a result, the frame 86 and antenna head 73 are tilted on the roll axis 120, so as to set into the bombsight the cross-trail factor due to the action of a cross wind on the bomb.

The operation of the bombsight is as follows: The aircraft carrying the bombsight is flown in horizontal flight at an altitude which the bombardier may determine by disengaging the clutch 112 and turning the displacement knob 70 until the axis of antenna 72 is in a vertical position, which may be determined by suitable stops (not shown). With the radar system operating, the bombardier will then observe pips 101 and 101a in the precision screen 100 and will adjust the range matching knob 104 until the steps 118 and 118a are matched with the pips 101 and 101a, respectively, as shown in Fig. 7. The range matching knob 104 will then indicate the altitude (H) of the aircraft.

In order to aid the bombardier in his location of a target, the search scope 99 may be turned on by one of the switches 102, whereby the antenna 72 is moved with a scanning motion and the field which is scanned is presented in the scope 99. When the bombardier observes a target in the search scope 99, he informs the pilot who, by means of the duplicate search scope 99a, guides the plane so that the target is on the usual "lubber's" or vertical reference line on the search scope, at which time the scanning motion of the antenna 72 is terminated so that the antenna axis is pointed straight forward and is approximately on the target in azimuth. The slant range to the target is determined by the bombardier by observing the position of the target on the search scope 99 with reference to the usual horizontal electronic range markers, which have different range values for different positions of the search range knob 103.

At this time, the speed knob 24 for the constant speed motor 20 is adjusted to establish the proper speed of disc 26, which is determined by the known altitude (H) from suitable ballistic tables. Also, the trail arm 41 is adjusted to set in the desired trail value (T), which is likewise obtained from ballistic tables.

*Dropping angle determination*

The antenna 72 is again moved to the vertical position by rotation of displacement knob 70, which moves the antenna through differential 53, rack 56, plate 60, pinion 61, cable 65, connection 81, 81a, worm 80, and gear 84. The altitude reading (H) is then set into the multiplier 111 by adjustment of knob 111a, whereupon the clutch 112 is engaged. The displacement knob 70 is then adjusted so as to turn the antenna head 73 on shaft 85 until the range reading of the range matching dial 104 corresponds approximately to the range reading observed in the search scope 99. It will be understood that adjustment of displacement knob 70 not only moves the antenna 72, as described, but also turns the radar range-matching knob 104 through rack 105, pinion 107, connection 110, 110a, multiplier 111, clutch 112, worms 113 and 115, and gear 116, whereby the steps 118 and 118a are adjusted along the scope 100 relative to the pips 101 and 101a. Thus, when the precision scope 100 is turned on by one of the switches 102, the antenna axis should be approximately on the target so that a radar indication of the target will appear on precision screen 100 in the form of pips 101 and 101a. At this time, the pips will move to the left along the scope 100 as the slant range decreases, and the steps 118 and 118a will also move to the left due to the fact that the gear 116 is driven from the adjustable roller 30 through differential 53, racks 56 and 105 (Fig. 3), and multiplier 111.

The next operation is to obtain synchronism in the movements of the pips and the steps on the scope 100. This is accomplished by adjusting the screw spindle 28 through rate knob 35 until the speed of movement of rack 105 is sufficient to cause the steps 118, 118a to move along the scope at the same rate as the pips 101, 101a. Then, the displacement knob 70 is adjusted to match the steps with the pips, as shown in Fig. 7. At this time, the solving mechanism shown in Figs. 1 and 2 is properly adjusted and synchronized to solve for the dropping angle ($\theta$) in the manner previously described. Thereafter, the bombardier makes any adjustments of the displacement knob 70 and the rate knob 35 necessary to maintain synchronism of the pips and the steps on scope 100, until the release finger 50 (Fig. 2) moves into the notch 60b, whereupon the bomb is released. It will be observed that as the sight angle to the target decreases, the antenna is rotated on shaft 85 through the sheave 67 so as to maintain the antenna axis on the target in range.

*Collision course determination*

As pointed out heretofore, the pipe 101 and 101a on the precision scope 100 appear of equal height when the directive axis of the lobing antenna 72 is on the target in azimuth. When the pips 101 and 101a appear of unequal height, they indicate to the bombardier that the target is offset in deflection from the antenna lobing axis, in a direction depending upon which of the pips is of greater height, and in an amount dependent upon the relative heights of the pips. When such a deflection of the target is indicated, the bombardier adjusts the turn knob 163 to move the antenna axis in azimuth in the proper direction and proper amount to equalize the heights of the pips 101 and 101a. This adjustment of the turn knob 163 also actuates the BDI 175 and PDI 175a, whereupon the pilot turns the plane until his PDI indicator 175a is again at zero.

Assuming that the aircraft approaches the target with a cross-wind, the resulting drift of the aircraft causes the pips 101 and 101a to become of unequal height due to deflection of the target with respect to the antenna lobing axis. The bombardier then operates the drift knob 167 so as to move the indicators 175 and 175a in a direction determined by the direction of drift of the aircraft. The pilot then turns the aircraft to bring the indicators 175 and 175a back to the zero position, and this operation by the bombardier and pilot is repeated until the proper drift angle ($x$) is established, which will be indicated when the pips 101 and 101a are maintained at the same relative heights without further adjustment. Then, the turn knob 163 is adjusted to move the antenna about the vertical axis 183a until the pips 101 and 101a again assume equal heights, indicating that the antenna axis is on the target in azimuth. If the aircraft continues to drift with respect to the target, as indicated by a further change in the relative heights of pips 101 and 101a, the operation previously described is repeated until the pips are maintained equal in height. This operation may be facilitated by "double clutching;" that is, by turning the turn knob 163 and the drift knob 167 together, as is well known in the art.

It will be observed that in setting in the drift angle by rotation of drift knob 167, the gear 190 is rotated and turns the cam block 136 on pin 138 as an axis, so that lever 135 tilts the antenna head 73 about the roll axis 120 an amount determined by the trail setting (T) of arm 41 multiplied by sin ($x$), where ($x$) is the final drift angle set in by drift knob 167. This adjustment has the effect of offsetting the target in deflection with respect to the antenna axis, so that the pips 101, 101a become of unequal height and necessitate an adjustment of aircraft course, as previously described, with the result that compensation is made for the cross-trail of the bomb due to drift.

In the following claims, it will be understood that the term "radar" is intended to denote radio detection and ranging, as is well-known in the art.

The invention herein described may be manufactured and used by or for the Government of the United States of America for governmental purposes without the payment of any royalties thereon or therefor.

We claim:
1. A bombsight comprising a radio detection and ranging system for providing an indication of the slant range from the aircraft to the target, means adjustable to correspondence with said indication, means for solving the dropping angle including a driving member, and an operative connection from the driving member to the adjustable means for maintaining the same in correspondence with said slant range indication.

2. A bombsight comprising a radio detection and ranging system having a precision scope for providing "pip" indications of the slant range from the aircraft to the target, means for providing "step" indications in said scope and adjustable to position the "step" indications relative to the "pip" indications, means for solving the dropping angle including a driving member, and a connection from the driving member to said adjustable means for maintaining the "step" indications in fixed relation to the "pip" indications.

3. A bombsight comprising a radio detection and ranging system for providing an indication of the slant range from the aircraft to the target, means adjustable to correspondence with said indication, means for solving the dropping angle including a constant speed driving motor, an operative connection from the motor to the adjustable means, and adjustable means in said connection for varying the speed ratio between the motor and the first adjustable means to synchronize the first adjustable means and the slant range indication.

4. A bombsight comprising a radio detection and ranging system for providing an indication of the slant range from the aircraft to the target, means adjustable to correspondence with said indication, means for solving the dropping angle including a constant speed driving motor, an operative connection from the motor to the adjustable means, adjustable means in said connection for varying the speed ratio between the motor and the first adjustable means to synchronize the first adjustable means with the slant range indication, and manually operable means in said connection for displacing the first adjustable means into correspondence with the slant range indication.

5. A bombsight comprising a radio detection and ranging system for providing an indication of the slant range from the aircraft to the target, said system including a directive antenna and means adjustable to correspondence with said indication to provide a slant range reading, gyro means for stabilizing the antenna about pitch and roll axes on the supporting aircraft, means for solving the dropping angle including a variable speed driving member, an operative connection between said driving member and the adjustable means, adjustable means for varying the speed of said driving member to synchronize the first adjustable means with the slant range indication, and manually operable means in said connection for displacing the first adjustable means into correspondence with the slant range indication.

6. A bombsight comprising a radio detection and ranging system for providing an indication of the slant range from the aircraft to the target, said system including a directive antenna and means adjustable to correspondence with said indication to provide a slant range reading, gyro means for stabilizing the antenna about pitch and roll axes on the supporting aircraft, means for solving the dropping angle including a variable speed driving member, an operative connection between said driving member and the antenna for rotating the antenna about said pitch axis, a second operative connection between said driving member and the adjustable means, adjustable means for varying the speed of said driving member to synchronize the first adjustable means with slant range indication, and manually operable means in said connection for displacing the first adjustable means into correspondence with the slant range indication.

7. A bombsight comprising a radio detection and ranging system for providing an indication of the slant range from the aircraft to a target, said system having a directive antenna, gyro means for stabilizing the antenna about roll and pitch axes on the aircraft, adjustable means movable into correspondence with said indication to provide a target slant range reading, mechanism for solving for the dropping angle including a variable speed driving member, an operative connection between the driving member and the antenna for moving the antenna about said pitch axis to maintain the antenna axis substantially on the target in range during closing thereof, a second operative connection between the driving member and said adjustable means, adjustment means for varying the speed of the driving member to synchronize the adjustable means with said indication, and means operable independently of said driving member for moving the antenna and displacing the adjustable means into correspondence with said indication.

8. A bombsight comprising a radio detection and ranging system for providing an indication of the slant range from the aircraft to a target, said system having a directive antenna, gyro means for stabilizing the antenna about roll and pitch axes on the aircraft, index means movable into correspondence with said indication to provide a target slant range reading, mechanism for solving for the dropping angle including a right triangle having a known altitude ($h$) proportional to the aircraft altitude ($H$), an adjustable base representing horizontal target range, and an adjustable hypotenuse, a variable speed driving member for decreasing the length of said base and hypotenuse during closing of the target, an operative connection between the triangle and said index means for adjusting the index means in accordance with the change in length of the hypotenuse of the triangle, a multiplier in said connection for setting in the known ratio of $H/h$, and means for adjusting the speed of said driving member to synchronize the index means with said indication.

9. In a bombsight, a radio detection and ranging system for providing an indication of the slant range from the aircraft to a target, said system having a directive antenna, gyro means for stabilizing the antenna about roll and pitch axes on the aircraft, index means adjustable into correspondence with said indication to provide a target slant range reading, a pair of right triangles each having an adjustable base and hypotenuse and a known altitude ($h$) proportional to the aircraft altitude ($H$), a variable speed driving member connected to one of said triangles for decreasing the base length thereof during closing of the target, an operative connection between said first triangle and said index means for adjusting the index means in accordance with the change in length of the hypotenuse of said first triangle, a multiplier in said connection for setting in the known ratio of $H/h$, means for adjusting the speed of said driving member to synchronize the index means with said indication, means operable by said last adjusting means for setting into the second triangle a dropping angle tan $$\tan^{-1} \frac{(V_c t_f) - T}{H}$$

where $V_c$ is the horizontal speed of closing the target, $t_f$ is the known time of bomb flight and $T$ is the known bomb trail, and control means operable when the range angle in the first triangle equals the dropping angle in the second triangle.

10. In a bombsight, a radio detection and ranging system for providing an indication of the slant range from the aircraft to a target, said system having a directive antenna, gyro means for stabilizing the antenna about roll and pitch axes on the aircraft, index means adjustable into correspondence with said indication to provide a target slant range reading, a pair of right triangles each having an adjustable base and hypotenuse and a known altitude (h) proportional to the aircraft altitude (H), a variable speed driving member connected to one of said triangles for decreasing the base length thereof during closing of the target, an operative connection between said first triangle and said index means for adjusting the index means in accordance with the change in length of the hypotenuse of said first triangle, a multiplier in said connection for setting in the known ratio of H/h, means for adjusting the speed of said driving member to synchronize the index means with said indication, displacement means in said connection for displacing said index means into correspondence with said indication independently of the driving member, means operable by said last adjusting means for setting into the second triangle a dropping angle $$\tan^{-1} \frac{(V_c t_f) - T}{H}$$

where $V_c$ is the horizontal speed of closing the target, $t_f$ is the known time of bomb flight and $T$ is the known bomb trail, and control means operable when the range angle in the first triangle equals the dropping angle in the second triangle.

11. A bombsight comprising a radio detection and ranging system for providing an indication of the slant range from the aircraft to a target, said system having a directive antenna, gyro means for stabilizing the antenna about roll and pitch axes on the aircraft, index means adjustable into correspondence with said indication to provide a target slant range reading, and means for solving for the dropping angle including a variable speed driving member coupled to said index means and adjustment means for varying the speed of said driving member to synchronize the index means with said indication.

12. A bombsight comprising a radio detection and ranging system having a directive antenna and means for providing an indication of the bearing of a target relative to the antenna axis and an indication of the slant range to the target, gyro means for stabilizing the antenna about a yaw axis on the aircraft, a second gyro means for stabilizing the antenna about pitch and roll axes on the aircraft, means for setting up a target collision course of the aircraft including an adjustment member operatively connected to the antenna for adjusting the same on the yaw axis relative to said first gyro means, index means adjustable into correspondence with said indication to provide a target slant range reading, means for solving for the dropping angle including a variable speed driving member connected to said index means and adjustable to synchronize the index means with said slant range indication, and an operative connection between the driving member and the antenna for moving the antenna about the pitch axis to maintain the antenna axis substantially on the target in range during closing of the target.

13. A bombsight comprising a radio detection and ranging system having a directive antenna and means for providing an indication of the bearing of a target relative to the antenna axis and an indication of the slant range to the target, gyro means for stabilizing the antenna about a yaw axis on the aircraft, a second gyro means for stabilizing the antenna about pitch and roll axes on the aircraft, means for setting up a target collision course of the aircraft including an adjustment member operatively connected to the antenna for adjusting the same on the yaw axis relative to said first gyro means, index means adjustable into correspondence with said indication to provide a target slant range reading, means for solving for the dropping angle including a variable speed driving member connected to said index means and adjustable to synchronize the index means with said slant range indication, an operative connection between the driving member and the antenna for moving the antenna about the pitch axis to maintain the antenna axis substantially on the target in range during closing of the target, and means operable jointly by said collision course means and said solving means for moving the antenna about the roll axis relative to the gyro means to correct the bombsight for cross-trail of the bomb.

14. In precision bombing, the method of determining the aircraft speed of closing the target along the horizontal plane of the target, which comprises providing a continuous indication of the decreasing actual slant range from the aircraft to the target during said closing, forming a small right triangle in which the vertical side represents the known aircraft altitude and the base represents an assumed horizontal range from the aircraft to the target, providing a continuous indication comparable with said first indication of a value equal to the hypotenuse of said triangle multiplied by the known ratio of the actual aircraft altitude to said vertical side of the triangle, and continuously adjusting the base and hypotenuse of the right triangle during said closing to maintain said two indications in correspondence, whereby the rate of decrease in the length of said base of the triangle is a measure of said speed of closing.

15. In precision bombing, the method of determining the aircraft speed of closing the target along the horizontal plane of the target, which comprises providing a continuous indication of the decreasing actual slant range from the aircraft to the target during said closing, forming a small right triangle in which the vertical side represents the known aircraft altitude and the base represents an assumed horizontal range from the aircraft to the target, providing a continuous indication comparable with said first indication of a value equal to the hypotenuse of said triangle multiplied by the known ratio of the actual aircraft altitude to said vertical side of the triangle, continuously shortening the base and hypotenuse of the right triangle during said closing, and adjusting the rate of said shortening to maintain said two indications in synchronism, whereby the rate of shortening of the length of said base of the triangle is a measure of said speed of closing.

MALCOLM F. SCHOEFFEL.
LOUIS G. POOLER.

REFERENCES CITED

The following references are of record in the file of this patent:

UNITED STATES PATENTS

| Number | Name | Date |
|---|---|---|
| 2,372,185 | Wittkuhns | Mar. 27, 1945 |
| 2,408,782 | Eaton | Oct. 8, 1946 |
| 2,414,108 | Knowles et al. | Jan. 14, 1947 |
| 2,426,658 | Wooldridge | Sept. 2, 1947 |
| 2,433,843 | Hammond et al. | Jan. 8, 1948 |
| 2,439,381 | Darlington et al. | Apr. 13, 1948 |
| 2,442,389 | Weiss | June 1, 1948 |